United States Patent [19]

Allen

[11] Patent Number: 4,660,083
[45] Date of Patent: Apr. 21, 1987

[54] VIDEO DISPLAY SYSTEM WITH STABILIZED BACKGROUND LEVEL

[75] Inventor: John K. Allen, Indianapolis, Ind.

[73] Assignee: RCA Corporation, Princeton, N.J.

[21] Appl. No.: 792,468

[22] Filed: Oct. 29, 1985

[51] Int. Cl.[4] .................. H04N 5/18; H04N 5/57
[52] U.S. Cl. .................... 358/168; 358/74; 358/172; 358/243
[58] Field of Search ............ 358/37, 64, 74, 168, 358/171, 172, 176, 173, 178, 169, 242, 243

[56] References Cited

U.S. PATENT DOCUMENTS

| | | | |
|---|---|---|---|
| 2,828,357 | 3/1958 | Fyler et al. | 358/178 |
| 4,044,375 | 8/1977 | Norman | 358/172 |
| 4,442,458 | 4/1984 | Barter | 358/172 |
| 4,599,651 | 7/1986 | Rodda | 358/168 |

Primary Examiner—Tommy P. Chin
Attorney, Agent, or Firm—P. J. Rasmussen; P. M. Emanuel; R. H. Kurdyla

[57] ABSTRACT

A video monitor includes a kinescope driver amplifier AC coupled to a kinescope via a capacitor which is also associated with a video signal clamp. A control signal related to the magnitude of video signals coupled to the kinescope modifies the kinescope bias so as to increase kinescope current conduction and image brightness, to counteract the tendency of a displayed image to exhibit reduced brightness as the amplitude of the video signal increases.

7 Claims, 1 Drawing Figure

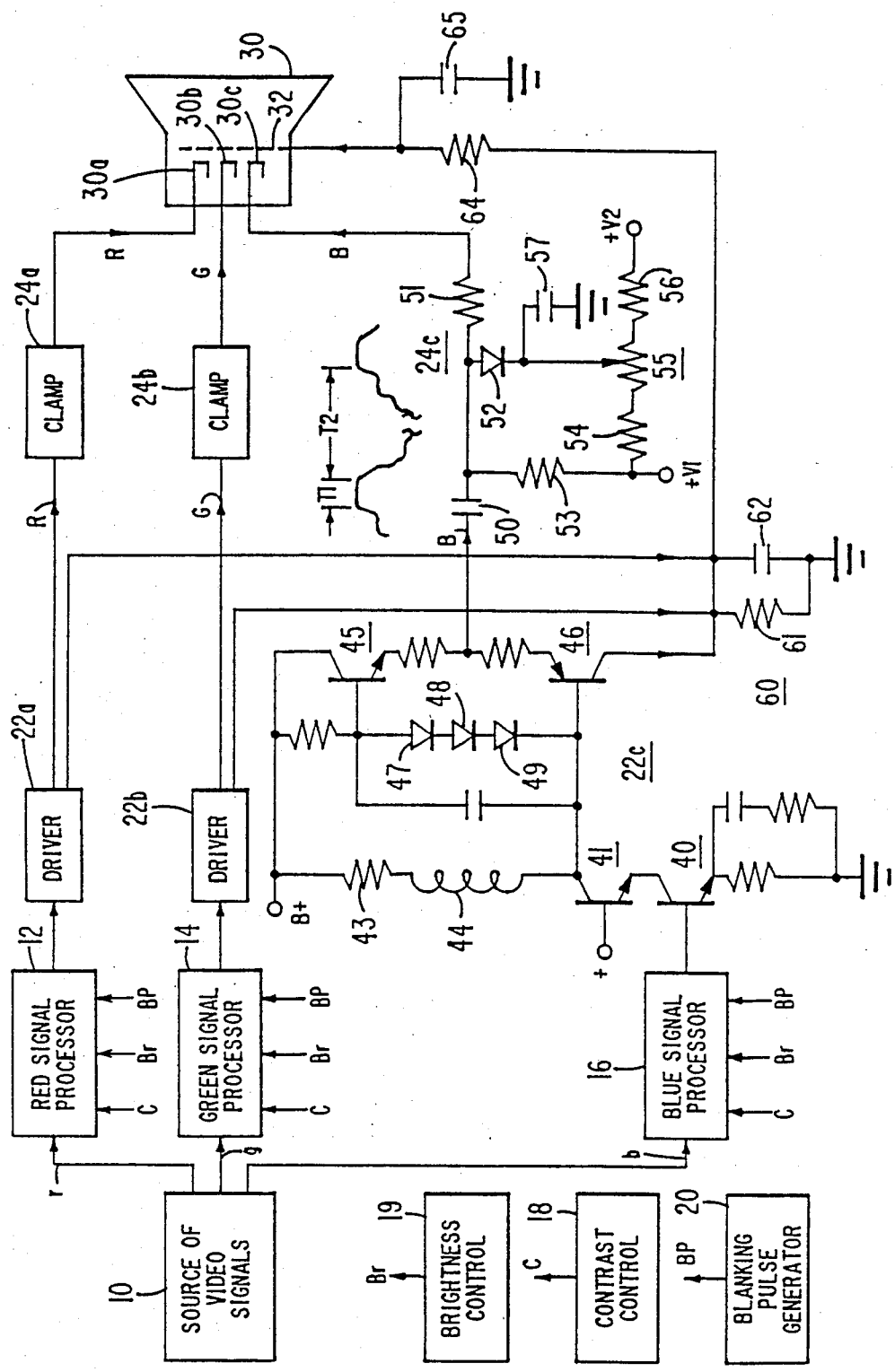

VIDEO DISPLAY SYSTEM WITH STABILIZED BACKGROUND LEVEL

This invention concerns a video signal processing and display system wherein the background (brightness) level of a displayed scene is automatically controlled so as to remain substantially fixed with variations in the magnitude of a video signal containing information to be displayed.

In some types of video signal processing and display systems, such as video monitors, it is particularly important to maintain a substantially constant level of image brightness in the presence of changes in the magnitude of the video signal containing information to be displayed. Changes in video signal magnitude can result from viewer adjustment of a manual contrast control, or from changes in the peak-to-peak amplitude of the video signal associated with program content. It is particularly important to maintain a uniform brightness level in the case of a video monitor such as a data display terminal due to the nature of the information which is customarily displayed by such monitors. The information displayed by such monitors is often in the form of alphanumeric data or graphics displayed against a uniform background color and, in such case, even a slight change in image brightness associated with a change in video signal magnitude can be noticed by a viewer and objected to.

Video monitors used for data display purposes are often wide bandwidth devices to provide the degree of image resolution required for displaying alphanumeric data clearly. To achieve wide bandwidth capability video monitors sometimes employ a display driver stage with a relatively low impedance load circuit, capacitively coupled to the display device. The coupling capacitor may advantageously form a part of an output clamping circuit for establishing a desired DC voltage condition for the signal input electrode of the display device. It has been observed, however, that such output clamp circuit can produce an unwanted DC voltage shift as the magnitude of the video signal varies such as in response to program content or the setting of the contrast control. Specifically, it has been observed that the image background brightness level becomes darker as the magnitude of the video signal increases, perhaps because of the non-ideal nature of the clamp. This undesired condition is addressed by apparatus according to the present invention.

In accordance with the principles of the present invention, a video signal processing and display system includes an image display device, a video signal channel for conveying a video signal to the display device, and a clamp included in the video signal channel for clamping the video signal. A control signal having a magnitude related to the magnitude of the video signal is coupled to the display device for modifying the bias of the display device so as to reduce the tendency of image brightness to darken as the magnitude of the video signal increases. Thus the control signal causes the display device to exhibit increased conduction as the magnitude of the video signal applied to the display driver increases.

The sole FIGURE of the drawing shows a portion of a video monitor including apparatus in accordance with the principles of the present invention.

Color video signals r (red), g (green) and b (blue) from a source 10 are respectively coupled to video signal processors 12, 14 and 16, which also receive a variable contrast control voltage C from a viewer controllable contrast control network 18, a variable brightness control voltage Br from a viewer controllable brightness control network 19, and a horizontal blanking pulse BP from a blanking pulse generator 20. Contrast control voltage C, e.g., derived from a potentiometer, simultaneously varies the peak-to-peak amplitude of the r, g and b signals by simultaneously adjusting the signal gains of video signal amplifiers associated with processors 12, 14 and 16. Brightness control voltage Br, which may also be derived from a potentiometer, varies the DC black level of the r, g and b signals simultaneously by changing the bias of black level clamp circuits associated with processors 12, 14 and 16. Afterwards, a fixed amplitude blanking pulse BP is added to the r, g and b video signals during each horizontal blanking interval to assist in establishing the image blanking level of the video signals as will be discussed below.

Processed r, g and b video signals from processors 12, 14 and 16 are respectively conveyed to an image reproducing kinescope 30 via video output display driver stages 22a, 22b and 22c and via DC restoration clamp circuits 24a, 24b and 24c. Display driver stage 22c shown in detailed circuit form is similar to stages 22a and 22b. Similarly, clamp circuit 24c shown in detailed circuit form is similar to clamps 24a and 24b. High level amplified and clamped color signals R, G and B are applied to cathode intensity control electrodes 30a, 30b and 30c of kinescope 20, which also includes a control grid electrode 32. The following description of driver 22c and clamp 24c also applies to similar drivers 22a and 22b and similar clamps 24a and 25b.

Kinescope driver 22c includes an input common emitter transistor amplifier 40 arranged in a cascode amplifier configuration with a common base output transistor amplifier 41. The output circuit of transistor 41 includes a load resistor 43 coupled to a source of positive operating voltage B+, a high frequency peaking coil 44, complementary emitter follower output buffer transistors 45 and 46, and diodes 47, 48 and 49 which bias transistors 45 and 46 for linear operation. A high level amplified B (blue) signal suitable for directly driving cathode 30c of kinescope 30 is derived from the interconnected emitter circuits of transistors 45 and 46, and is conveyed to kinescope cathode 30c via a current limiting resistor 51 and an AC coupling capacitor 50 which is operatively associated with output clamp 24c.

Clamp 24c also includes a clamping diode 52, biasing resistors 53, 54 and 56, a pre-set potentiometer 55, and a filter capacitor 57. The cathode bias and clamping point of clamp diode 52 is established by adjusting potentiometer 55 during manufacturing alignment of the system so that normally nonconductive diode 52 conducts to clamp the positive blanking level of the video signal to a given DC reference level (as determined by the setting of potentiometer 55) during each horizontal line blanking interval (T1) which occurs between video signal image line trace intervals (T2) as indicated by the waveform insert. Negative-going video signal amplitude excursions at the collector of transistor 41 and at the emitter of transistor 46 caused increased current conduction by kinescope cathode 30c, resulting in a more intense image display.

It has been observed that as the magnitude of the video signal increases in a negative (less positive) direction, such as in response to a setting of contrast control network 18 which increases the gain of video signal amplifier circuits in processor 16, the DC level of the clamped video signal which drives kinescope cathode 30c is such that the brightness of a displayed image decreases slightly but noticeably. The cause of this phenomenon appears to be related to the resistance associated with (non-ideal) clamp circuit 24c as including resistors 54, 55 and 56 which together may total more than 50 kilohms in resistance value, and may also be related to the operation of non-ideal black level clamp circuits associated with signal processors 12, 14 and 16.

To substantially counteract this unwanted phenomenon, the collector of follower transistor 46 is coupled to an average responding filter network 60 including a resistor 61 and an integrating capacitor 62. Filter 60 is similarly connected to collector electrodes of follower transistors associated with driver stages 22a and 22b. A DC control voltage developed across capacitor 62 is related to the average magnitude of the combined video signals being applied to kinescope 30 via drivers 22a, 22b and 22c. The control voltage is coupled via a resistor 64 to control grid 32 of kinescope 30 for modifying the bias thereof, and thereby modifying the conduction of each kinescope image intensity control electron gun assembly comprising grid 32 and each of the cathodes 30a, 30b and 30c. Resistor 64 isolates kinescope arcs from other parts of the circuit, and a capacitor 65 bypasses kinescope arcs to ground.

The magnitude of collector current conducted by transistor 46 is related to current conducted by kinescope cathode 30c, and the magnitude of the collector current of transistor 46 increases as the magnitude of video signal B increases in a less positive direction corresponding to a more intense image display. In the absence of the control voltage developed by filter 60, this condition would result in a reduction in image brightness, toward black, as noted above. To counteract this black-going effect, the video-related increased current conduction of transistor 46 causes the control voltage developed across capacitor 62 to increase, which in turn results in a more positive bias voltage being applied to grid 32 of kinescope 30. That is, grid 32 is forward biased more at the same time that cathode 30c is driven harder, causing the intensity control electron gun assembly formed by grid 32 and cathode 30c to increase DC current conduction and image brightness by an amount sufficient to substantially counteract the tendency of the system to otherwise display an image with slightly reduced brightness.

The magnitude of the video signal can be sensed at other circuit points, such as at the emitter of input transistor 40 of driver stage 22c for example.

What is claimed is:

1. A video signal processing and display system comprising
   an image display device including an intensity control assembly for receiving a conveyed video signal containing information to be displayed;
   a video signal channel for conveying a video signal containing information to be displayed to said image display device;
   video signal clamping means, included in said video channel, for clamping said conveyed video signal during given intervals;
   control means coupled to said video channel for developing a control signal with a magnitude related to the magnitude of said conveyed video signal; and
   means for coupling said control signal to said intensity control assembly of said image display device with a polarity for increasing the current conduction of said intensity control assembly in accordance with increasing magnitude of said conveyed video signal.

2. A system according to claim 1, wherein
   said image display device is a kinescope with said intensity control assembly including a cathode electrode for receiving said conveyed video signal via said video signal channel, and a grid electrode for receiving said control signal.

3. A video signal processing and display system comprising
   an image display device including an intensity control assembly for receiving a video signal containing information to be displayed;
   a video signal channel including a display driver amplifier responsive to said video signal for providing an amplified video signal at an output;
   means for capacitively coupling said output of said driver amplifier to said intensity control assembly of said display device via a current path;
   clamp means coupled to said current path for clamping said amplified video signal during given intervals;
   control means coupled to said video channel for developing a control signal with a magnitude related to the magnitude of said amplified video signal; and
   means for coupling said control signal to said intensity control assembly of said display device with a polarity for increasing the current conduction of said intensity control assembly in accordance with increasing magnitude of said amplified video signal.

4. A system according to claim 3, wherein
   said control means is an average responding filter.

5. A system according to claim 3, wherein
   said image display device is a kinescope with an intensity control assembly including a cathode electrode for receiving said amplified video signal via said current path, and a grid electrode for receiving said control signal.

6. A system according to claim 3, wherein
   said display driver amplifier includes an emitter follower transistor for providing said amplified video signal from an output thereof to said capacitive coupling means; and
   said control means is coupled to said emitter follower transistor for developing said control signal in accordance with the magnitude of current conducted by said emitter follower transistor.

7. A system according to claim 3, wherein
   said system comprises plural video signal channels for respectively processing plural color image representative video signals to provide plural amplified color image representative video signals; and
   said control means is coupled to said plural video signal channels for developing said control signal in accordance with the combined average magnitude of said plural amplified color image representative video signals.

* * * * *